US008166520B2

(12) United States Patent
Holm et al.

(10) Patent No.: US 8,166,520 B2
(45) Date of Patent: Apr. 24, 2012

(54) METHOD AND APPARATUS FOR HANDLING INVITES TO A MULTI-USER COMMUNICATION SESSION

(75) Inventors: Jan Holm, Örbyhus (SE); Henrik Albertsson, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 827 days.

(21) Appl. No.: 12/089,450

(22) PCT Filed: Oct. 13, 2005

(86) PCT No.: PCT/EP2005/055247
§ 371 (c)(1),
(2), (4) Date: Apr. 7, 2008

(87) PCT Pub. No.: WO2007/042079
PCT Pub. Date: Apr. 19, 2007

(65) Prior Publication Data
US 2008/0229390 A1    Sep. 18, 2008

(51) Int. Cl.
*G06F 17/30* (2006.01)
(52) U.S. Cl. ............ 726/3; 380/270; 370/252; 370/328; 370/338; 370/390; 709/228; 455/518
(58) Field of Classification Search .................. None
See application file for complete search history.

(56) References Cited

U.S. PATENT DOCUMENTS

| | | | | |
|---|---|---|---|---|
| 5,946,316 A * | 8/1999 | Chen et al. | ..................... | 370/408 |
| 7,466,825 B2 * | 12/2008 | Mousseau | ..................... | 380/270 |
| 2005/0105511 A1 * | 5/2005 | Poikselka | ..................... | 370/352 |
| 2006/0047820 A1 * | 3/2006 | Sung et al. | ..................... | 709/227 |
| 2007/0019645 A1 * | 1/2007 | Menon | ..................... | 370/390 |
| 2007/0140223 A1 * | 6/2007 | Bhatia et al. | ..................... | 370/352 |
| 2007/0208809 A1 * | 9/2007 | Westman | ..................... | 709/205 |

FOREIGN PATENT DOCUMENTS

| | | |
|---|---|---|
| KR | 2005-0007596 A | 1/2005 |
| WO | WO 20041077796 A2 | 9/2004 |

* cited by examiner

*Primary Examiner* — Nasser Goodarzi
*Assistant Examiner* — Fikremariam A Yalew

(57) ABSTRACT

A method of handling Invite messages for a multi-user communication session utilizing the IP Multimedia Subsystem to set up and control the session. Two or more access servers control user access. A first access server receives from a session-initiating user, an Invite that identifies as a potential participant, at least one user group which is owned by a second access server. The first access server sends to the second access server, an Invite that identifies the user group. The second server resolves the group identification into a set of group member identities and sends the identities in a response to the first access server. The first access server then sends Invites to at least some of the group members identified in the response.

10 Claims, 1 Drawing Sheet

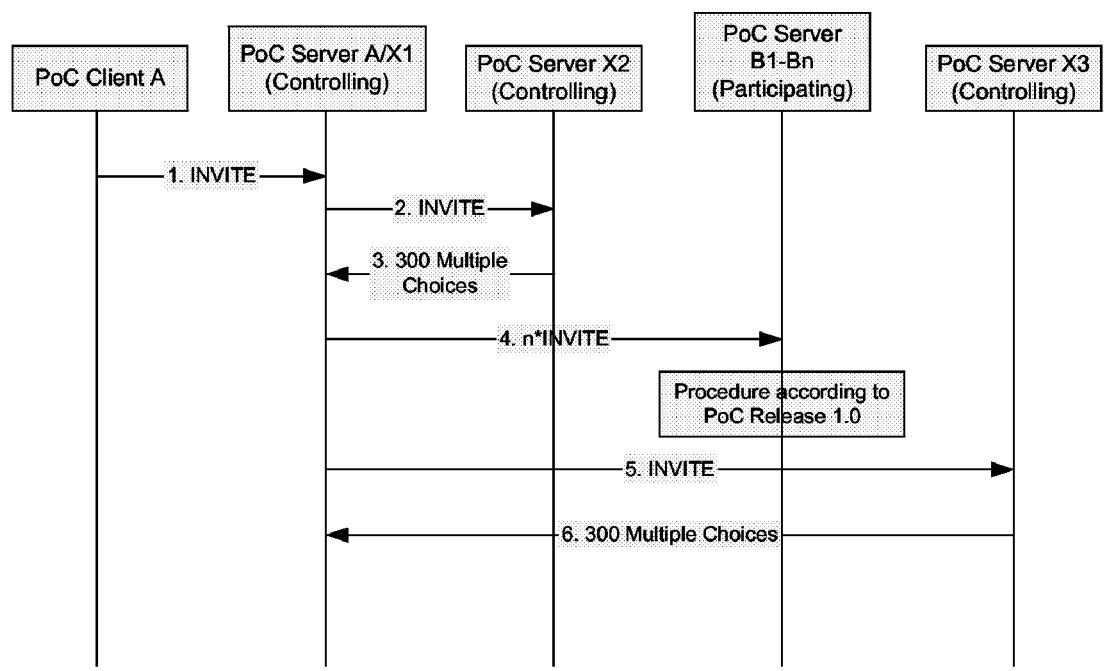

METHOD AND APPARATUS FOR HANDLING INVITES TO A MULTI-USER COMMUNICATION SESSION

FIELD OF THE INVENTION

The present invention relates to a method and apparatus for handling invites to a multi-user communication session. The invention is applicable in particular, though not necessarily, to conference type sessions such as push-to-talk.

BACKGROUND TO THE INVENTION

Walkie-talkie type services have long proved popular amongst users who wish to communicate brief messages quickly between one another. Conventionally, such services have been provided by two-way portable radios which utilise a dedicated part of the radio spectrum, but which only allow users to communicate with a small group of pre-selected users who utilise similar terminals and who are within range of the relatively short operating range of the radios. More recently, services have been introduced into the United States which piggy-back on the existing cellular telephone infrastructure. However, these services have been proprietary in nature and have not allowed users to communicate between different operator networks.

In an attempt to broaden the use of walkie-talkie type services, an industry grouping known as the Open Mobile Alliance (www.openmobilealliance.org) has been established with the aim of standardising suitable protocols which will allow inter-network operability for Warlike-Talkie services offered over cellular networks. The service established by the various standards is known as Push to talk Over cellular (PoC). PoC makes use of the IP Multimedia Subsystem (IMS) to handle the setting up and control of PoC sessions via PoC servers (acting as SIP ASs). PoC proposes that associated speech data will be transported over a packet switched access network. In the case of GSM and UMTS, this will be the general packet radio service (GPRS) access network. In other network architectures, analogous packet switched access networks will be utilised for transporting talk data. Push to Talk services may also be offered over circuit switched access networks, although this is not the preferred option. The current state of PoC is set out in Release 1.0.

SUMMARY OF THE INVENTION

PoC Release 1.0 provides for a conference functionality where multiple users may participate in a common PoC session. It is possible for each of the participants to be associated with a different PoC server, as would be the case where different users are registered with different operator networks. In such a scenario, one of the PoC servers, typically that associated with the initiating user, is designated to perform the Control PoC function, acting as a "conference bridge" and handling floor control (i.e. allocating talk slots to participants). Other PoC servers are referred to as Participating PoC servers.

A user may establish communication with a group of other users on an ad-hoc basis, i.e. the user can select from his phone book a number of users, press the PoC button on his terminal, and communication is established with all users that are available at that moment. PoC also allows a user to define groups of people (referred to by the OMA standards as a "Pre-arranged PoC Group"), where the group and a corresponding PoC Group Identity is stored at the user's PoC server in the Home Network. Once a group is defined, a user can initiate a PoC session with the available members of the group merely by sending an INVITE containing the Group Identity.

Consider now a PoC Server receiving from a user a request to establish an Ad-hoc PoC Group Session, the request contains a list of PoC Users to invite. For user identities (which are in the form of a Universal Resource Locator or URL) which correspond to an individual PoC User, the PoC Server can invite the PoC User without any problem using the PoC Release 1.0 procedure. This involves forwarding the INVITE to the PoC server identified as responsible for the destination user, where the forwarded INVITE includes the feature-tag "isfocus". This tag identifies that the sending PoC server is the controller of the PoC group session. The receiving server recognises this tag and in response does not establish itself as a controlling server. The receiving server merely forwards the INVITE to the destination user(s) for which it is responsible.

If the INVITE sent by the originating user contains an identity (URL) which corresponds to a PoC Group that is "owned" by the controlling PoC server, the server will merely "explode" the group and forward the INVITE to the PoC server(s) associated with group members. If the original INVITE contains a PoC Group Identity which is owned by a PoC server other than the controlling server, the controlling server will forward the INVITE to that owning server. This is where the problem begins, as in this situation PoC Release 1.0 forces the receiving PoC server to reject the INVITE. This feature is intended to retain control of PoC sessions at PoC servers owning particular groups and thereby prevent the establishment of multiple controlling PoC servers for a single PoC session.

A solution to the problem of multiple controlling PoC servers might involve some negotiation of who is the controller and the chaining of multiple PoC servers together. However, such a solution would be complex and may result in the establishment of "infinite" loops. There is also the issue of deciding the state of a PoC group when a PoC Group is invited to the Ad-hoc PoC Session. For example, if a member of the Pre-arranged PoC Group (not part of the Ad-hoc PoC Session for some reason) initiates a PoC Group Session for that Pre-Arranged PoC Group, shall that member be added to the Ad-hoc PoC Group Session or shall a separate PoC Group Session be established? Any policy for handling these "conflicts" will necessarily be complex.

A further problem which might arise in the case of PoC sessions involving pre-defined groups is that of a user belonging to several pre-defined and "nested" groups. This will result in the user receiving multiple invites to the same session. This would be both annoying and a waste of network resources (particularly problematic where the access network is a cellular network).

It will be appreciated that problems analogous to those described above arise in the case of other, non-PoC, IMS-based services, for example instant messaging services.

According to a first aspect of the present invention there is provided a method of handling invites to a multi-user communication session employing the IP Multimedia Subsystem to setup and control the session, wherein user access is controlled by two or more user access servers within the IP Multimedia Subsystem, the method comprising;

receiving a session invitation at a first user access server from a session initiating user, the invitation identifying as a potential participant at least one user group which is owned by a second user access server;

sending an invitation to the second user access server, the invitation including an identification of said user group;
at said second user access server, resolving the group identification into a set of group member identities;
sending a response containing said group member identities to said first user access server; and
at said first user access server, sending an invitation to at least some of the group members identified in said response.

A particular application of the present invention lies in the provision of a push-to-talk service such as, for example, Push-to-talk over Cellular (PoC). In this application, said user access servers are push-to-talk servers, and said users are push-to-talk clients. Said first user access server acts as a controlling PoC server, whilst said second user access server acts as a participating PoC server and not as a controlling server. Where multiple PoC servers are contacted by the controlling PoC server, all of the other servers act as participating PoC servers.

The method may comprise, at the second user access server, using a pre-defined policy to authorize invitation of the identified group to the session. Failure to authorize results in a rejection of the invitation.

The method may comprise, at the second user access server, using a pre-defined policy to authorize the requesting user to invite the identified group to the session. The pre-defined policy may require that the requesting user be a member of the pre-defined group in order to proceed. Failure to authorize results in a rejection of the invitation.

The method may comprise, upon receipt of the response at the first user access server, sending invites to ones of the group members according to a pre-defined policy. This policy may prevent the sending of invitations to group members which are themselves group identifications. In the event that the policy allows the sending of invitations to group members which are themselves group identifications, the policy may place a cap on the number of nested group identifications which are resolved into member identities.

According to a second aspect of the present invention there is provided a user access server for use in an IP Multimedia Subsystem, the server comprising;
    means for receiving a session invitation from a session initiating user, the invitation identifying as a potential participant at least one user group which is owned by a second user access server;
    means for sending an invitation to the second user access server, the invitation including an identification of said user group;
    means for receiving from said second user access server a response containing group member identities resolved by the second access server from said group identification; and
    means for sending an invitation to at least some of the group members identified in said response.

According to a third aspect of the present invention there is provided a user access server for use in an IP Multimedia Subsystem, the server comprising;
    means for receiving from another user access server an invitation including an identification of a user group owned by the receiving server;
    means for resolving the group identification into a set of group member identities; and
    means for sending a response containing said group member identities to said first user access server.

BRIEF DESCRIPTION OF CERTAIN EMBODIMENTS

FIG. 1 shows a signalling flow in a PoC architecture associated with the setting up of a PoC conference.

DETAILED DESCRIPTION OF A PREFERRED EMBODIMENT

A Push-to-talk over Cellular (PoC) client (Client A) initiates a PoC Group Session using the procedure defined by OMA PoC. The PoC Group Session can use a Pre-established Session or be On-demand. In the case of a Pre-established Session, the PoC Client establishes a SIP session to its PoC Server in the Home network using an INVITE (typically when the PoC Client register to IMS). Once the SIP session is established the PoC Client can initiate a PoC Session using the Pre-established Session and the SIP REFER request. In the case of an On-demand session, the PoC Client initiates PoC Sessions without first establishing a Pre-established session, using the SIP INVITE request directly.

The list of users to be invited is included in the SIP request (typically a SIP INVITE) sent to the initiator's Home PoC server. In the example considered here, the list of PoC users to be invited consists of a mixture of PoC Addresses (URIs) of individual PoC Users and PoC Group Identities of Pre-arranged PoC Groups. FIG. 1 illustrates the signalling flow associated with the PoC session establishment, assuming an Ad-hoc PoC Group Session using On-demand signaling as an example. The same principle applies for Ad-hoc PoC Group Session using a Pre-established Session signaling and Pre-Arranged PoC Group Session using On-demand signaling or Pre-established Session signalling.

The signalling steps are as follows:
1. The PoC Client A sends a SIP INVITE request to its home PoC Server identified by a Conference URI (typically a "factory" setting in the client). The SIP INVITE request contains PoC Addresses identifying PoC Users and two PoC Group Identity identifying a Pre-Arranged group, Group X and Group Y.
2. & 4. The PoC Server A/X1 identifies the SIP INVITE request to be the initialization of an Ad-hoc PoC Group Session and starts to send invitations according to the invitation list. The invitations include the feature-tag "isfocus" to indicate that the PoC Server A/X1 is the controller of the PoC Group Session to be established. The sending of Invites to individual PoC users is represented at step 4., where the participating servers are shown as a single server B1-Bn.
3. One of the receivers is the PoC Server X2 which is the owner of Group X. The PoC Server X2 (the PoC Server handling the Pre-arranged PoC Group) detects the feature-tag "isfocus" contained in the INVITE, and performs the following steps:
    a) It checks if it is allowed according to its policy to invite Group X to another PoC Session. The policy may be per Pre-Arranged PoC Group or may be a general PoC service policy. In this example it is allowed.
    b) It then authorizes the initiator. This could be done by checking if the inviting PoC user is a member of Group X. In this example the PoC User is a member. This could be done using the P-Asserted-Identity header or the From header of the INVITE). Alternatively, authorization may be based upon a group policy defined by the group owner (e.g. a "white" list), or on an operator defined policy.

c) It returns a SIP 3xx or SIP 4xx response including the list of members of the PoC group to the PoC server A/X1. In the Figure, the SIP 300 "Multiple Choices" response is sent to the PoC Server A/X1. The list of members may include both individual PoC Users and further PoC Groups.

[If according to check a), the group cannot be invited to another PoC session, the INVITE is rejected. Similarly, if according to check b) the inviting user is not a member of the group, the INVITE is rejected. Of course, alternative policies for determining what action to take in such situations can be defined.]

4. The PoC Server A/X1 receives the list and performs the following:
   a) It checks its policy and decides to invite the set of PoC Users contained in the SIP 300. It rejects any group identities contained in the response.
   b) It removes already invited users from the list in order to avoid the sending of duplicate INVITEs to individual clients (and groups).
   c) It invites the rest of the users on the list and sends an INVITE request to each address.

5. & 6. Another recipient of the original INVITE is the PoC server X3 which is the owner of Group Y. PoC server X3 performs the same checks as were performed by server X2 and, assuming that it accepts the INVITE, returns a SIP 300 "Multiple Choices" response includes all members of Group Y. Again, the list of members can include both individual PoC Users and other PoC Groups. PoC server repeats checks a) to c) described above.

In this example, the controlling PoC server rejects additional groups identified in response messages, i.e. it performs only a single level of Group Identity resolution. This is done to prevent lengthy group resolution processes and potentially infinite loop exchanges. However, some finite number of resolution levels may be permitted depending upon the policy implemented at the controlling PoC server.

It will be appreciated by the person of skill in the art that various modifications may be made to the above described embodiment without departing from the scope of the present invention.

The invention claimed is:

1. A method of handling invites to a multi-user communication session employing the IP Multimedia Subsystem to setup and control the session, wherein user access is controlled by two or more user access servers within the IP Multimedia Subsystem, the method comprising:
   receiving a session invitation at a first user access server from a session initiating user, the invitation identifying as a potential participant at least one user group which is owned by a second user access server;
   sending an invitation to the second user access server, the invitation including an identification of said user group;
   at said second user access server, resolving the group identification into a set of group member identities, wherein each group member identity in said set of group member identities is different for each different member in said user group;
   sending a response containing said group member identities to said first user access server; and
   at said first user access server, sending an invitation to each of the group members identified in said response that have not already been invited.

2. The method according to claim 1, wherein said session is a push-to-talk session and said user access servers are push-to-talk servers and said users are push-to-talk clients, said first user access server acting as a controlling push-to-talk server, while the second user access server acts as a participating push-to-talk server.

3. The method according to claim 1, further comprising, at the second user access server, using a pre-defined policy to authorize invitation of the identified group to the session.

4. The method according to claim 1, further comprising, at the second user access server, using a pre-defined policy to authorize the requesting user to invite the identified group to the session.

5. The method according to claim 4, wherein said pre-defined policy requires that the requesting user be a member of the pre-defined group in order to proceed.

6. The method according to claim 1, wherein the step of sending the invitation from the first access server to at least some of the identified group members includes sending invites to selected group members according to a pre-defined policy.

7. The method according to claim 6, wherein the pre-defined policy prevents the sending of invitations to group members which are themselves group identifications.

8. The method according to claim 6, wherein the pre-defined policy allows the sending of invitations to group members which are themselves group identifications up to a predefined number of nested levels.

9. A user access server for use in an IP Multimedia Subsystem, the server comprising:
   a message receiver configured to receive a session invitation from a session initiating user, the invitation identifying as a potential participant, at least one user group which is owned by a second user access server;
   a message transmitter configured to send an invitation to the second user access server, the invitation including an identification of said user group;
   wherein the message receiver is further configured to receive from said second user access server, a response containing a set of group member identities resolved by the second access server from said group identification, wherein each group member identity in said set of group member identities is different for each different member in said user group; and
   wherein the message transmitter is further configured to send an invitation to each of the group members identified in said response that have not already been invited.

10. A method of handling invites to a multi-user communication session employing the IP Multimedia Subsystem to setup and control the session, wherein user access is controlled by two or more user access servers within the IP Multimedia Subsystem, the method comprising:
   receiving a session invitation at a first user access server from a session initiating user, the invitation identifying as a potential participant at least one user group which is owned by a second user access server;
   sending an invitation to the second user access server, the invitation including an identification of said user group;
   at said second user access server, resolving the group identification into a set of group member identities, wherein each group member identity in said set of group member identities is different for each different member in said user group;
   sending a response containing said group member identities to said first user access server; and
   at said first user access server, sending an invitation to each of the group members identified in said response that have not already been invited, wherein said sending the invitation includes sending invitations to group members which are themselves group identifications up to a predefined number of nested levels.

* * * * *

UNITED STATES PATENT AND TRADEMARK OFFICE
CERTIFICATE OF CORRECTION

PATENT NO.       : 8,166,520 B2                                      Page 1 of 1
APPLICATION NO.  : 12/089450
DATED            : April 24, 2012
INVENTOR(S)      : Holm et al.

It is certified that error appears in the above-identified patent and that said Letters Patent is hereby corrected as shown below:

On the Title Page, in item (56), under "FOREIGN PATENT DOCUMENTS", in Column 1, Line 2, delete "WO 2004107796 A2" and insert -- WO 2004/07796 A2 --, therefor.

In Column 4, Line 2, delete "EMBODIMENTS" and insert -- EMBODIMENT --, therefor.

In Column 4, Line 48, delete "4.," and insert -- 4, --, therefor.

In Column 4, Line 64, delete "INVITE)." and insert -- INVITE. --, therefor.

Signed and Sealed this
Eleventh Day of September, 2012

David J. Kappos
*Director of the United States Patent and Trademark Office*